United States Patent
Min et al.

(10) Patent No.: US 10,235,779 B2
(45) Date of Patent: Mar. 19, 2019

(54) IMAGE DISPLAY DEVICE AND IMAGE DISPLAY METHOD

(71) Applicant: SAMSUNG ELECTRONICS CO., LTD., Suwon-si (KR)

(72) Inventors: Byung-seok Min, Seoul (KR); Hyun-seung Lee, Seoul (KR); Young-su Moon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/484,640

(22) Filed: Apr. 11, 2017

(65) Prior Publication Data

US 2018/0018793 A1 Jan. 18, 2018

(30) Foreign Application Priority Data

Jul. 18, 2016 (KR) .................. 10-2016-0090776

(51) Int. Cl.
*G09G 5/02* (2006.01)
*G06T 11/00* (2006.01)

(52) U.S. Cl.
CPC .............. *G06T 11/001* (2013.01); *G09G 5/02* (2013.01); *G09G 2320/0666* (2013.01); *G09G 2320/0673* (2013.01); *G09G 2340/06* (2013.01)

(58) Field of Classification Search
CPC .......... G09G 5/02; G09G 5/06; G06T 11/001; H04N 1/60; H04N 9/643; H04N 1/6075
See application file for complete search history.

(56) References Cited

U.S. PATENT DOCUMENTS

| 7,612,782 B2 | 11/2009 | Kurumisawa et al. |
| 2008/0002062 A1 | 1/2008 | Kim et al. |
| 2010/0226572 A1 | 9/2010 | Adachi |
| 2014/0340418 A1 | 11/2014 | Matsumoto |
| 2016/0005349 A1 | 1/2016 | Atkins et al. |

FOREIGN PATENT DOCUMENTS

| JP | 2009-81849 A | 4/2009 |
| JP | 2012-248911 A | 12/2012 |
| KR | 10-0763239 B1 | 10/2007 |

OTHER PUBLICATIONS

Search Report dated Aug. 1, 2017, issued by the International Searching Authority in counterpart International Patent Application No. PCT/KR2017/003986 (PCT/ISA/210).
Written Opinion dated Aug. 1, 2017, issued by the International Searching Authority in counterpart International Patent Application No. PCT/KR2017/003986 (PCT/ISA/237).

*Primary Examiner* — Antonio A Caschera
(74) *Attorney, Agent, or Firm* — Sughrue Mion, PLLC

(57) ABSTRACT

An image display device may include a display and a controller configured to change a value of a pixel included in an input image based on a hue value and a saturation value of the pixel and control the display such that the display displays the image in which the value of the pixel has been changed.

16 Claims, 9 Drawing Sheets

(4 of 9 Drawing Sheet(s) Filed in Color)

FIG. 3
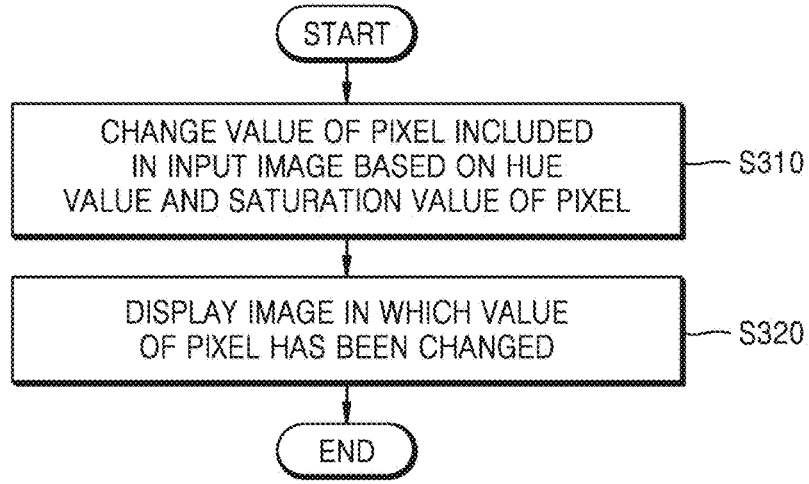
FIG. 4
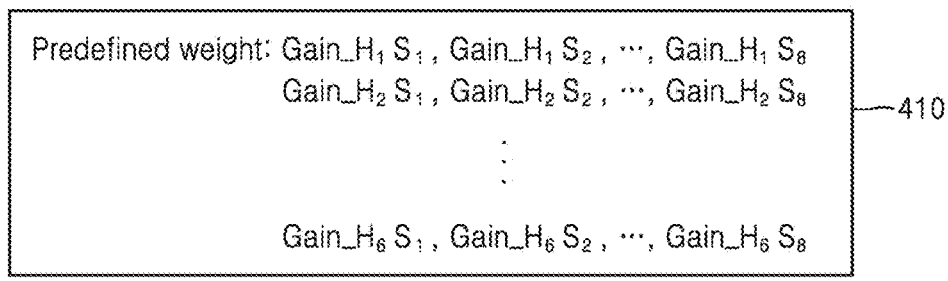
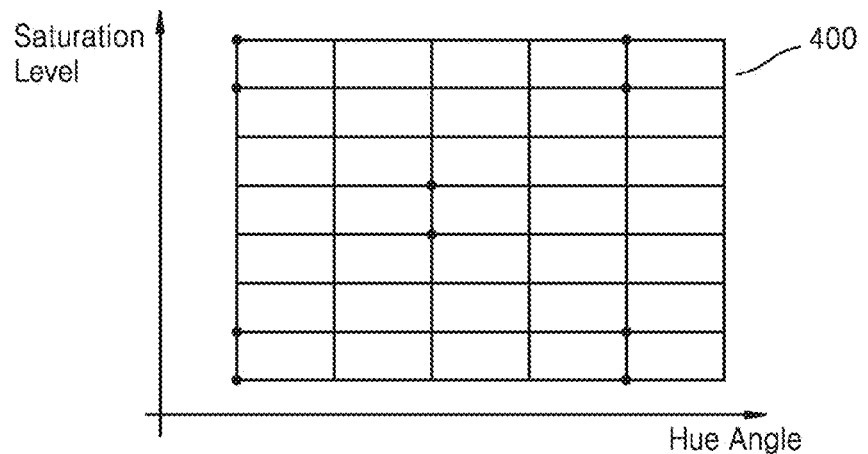
$k = f(Hue, Saturation) = Bilinear(Gain\_H_1 S_1, \ldots Gain\_H_n S_m)$ — 420

IMAGE DISPLAY DEVICE AND IMAGE DISPLAY METHOD

CROSS-REFERENCE TO RELATED APPLICATION

This application claims the benefit of Korean Patent Application No. 10-2016-0090776, filed on Jul. 18, 2016, in the Korean Intellectual Property Office, the disclosure of which is incorporated herein in its entirety by reference.

BACKGROUND

1. Field

The present disclosure relates to an image display device and an image display method, and more particularly, to a method of performing gamut mapping.

2. Description of the Related Art

Recently, along with developments in image acquisition technology and image display technology, a renderable range of colors has been gradually expanded. Accordingly, there frequently occurs a case in which a color gamut of an image display device differs from a color gamut of an input image displayed by the image display device. When a color gamut of an input image differs from a color gamut of an image display device, the image display device performs a gamut mapping process to display the input image having a color gamut different from that of the image display device.

SUMMARY

Provided is an image display device for performing gamut mapping to represent a color of an input image without distortion while using a wide color gamut.

Provided is a gamut mapping method requiring a small capacity of memory space with a reduced calculation complexity.

Additional aspects will be set forth in part in the description which follows and, in part, will be apparent from the description, or may be learned by practice of the presented embodiments.

According to an aspect of an exemplary embodiment, an image display device includes a display; and a controller configured to change a value of a pixel included in an input image based on a hue value and a saturation value of the pixel and control the display such that the display displays the image in which the value of the pixel has been changed.

The controller may be further configured to generate a gamut mapping matrix corresponding to the pixel based on the hue value and the saturation value and change the value of the pixel by using the generated gamut mapping matrix.

The gamut mapping matrix corresponding to the pixel may differ from a gamut mapping matrix corresponding to a pixel other than the pixel included in the input image.

The gamut mapping matrix may be determined by a linear combination of a first matrix expanding a color gamut of the input image to be displayed on the image display device to a color gamut of the image display device, a second matrix maintaining the color gamut of the input image to be displayed on the image display device, and a weight, and the weight may indicate a ratio of the first matrix to the second matrix in the gamut mapping matrix.

The controller may be further configured to determine a weight corresponding to the hue value and the saturation value and generate a gamut mapping matrix corresponding to the pixel based on the determined weight.

The controller may be further configured to determine that the weight increases as the saturation value increases.

The controller may be further configured to determine that the weight increases as a difference between first chromaticity coordinates in the color gamut of the input image and second chromaticity coordinates, which correspond to the first chromaticity coordinates, in the color gamut of the image display device increases.

The controller may be further configured to calculate the weight corresponding to the hue value and the saturation value of the pixel by performing bilinear interpolation based on weights corresponding to a plurality of hue values and a plurality of saturation values.

The image display device may further include a memory configured to store weights corresponding to a plurality of hue values and a plurality of saturation values, wherein the controller may be further configured to calculate the weight corresponding to the hue value and the saturation value of the pixel based on the stored weights corresponding to the plurality of hue values and the plurality of saturation values.

The first matrix and the second matrix may be generated based on chromaticity coordinates of primary colors and a reference white color in the color gamut of the input image and the color gamut of the image display device.

The first matrix may be an identity matrix.

According to an aspect of another exemplary embodiment, an image display method includes changing a value of a pixel included in an input image based on a hue value and a saturation value of the pixel; and displaying the image in which the value of the pixel has been changed.

The changing of the value of the pixel may include generating a gamut mapping matrix corresponding to the pixel based on the hue value and the saturation value; and changing the value of the pixel by using the generated gamut mapping matrix.

The gamut mapping matrix corresponding to the pixel may differ from a gamut mapping matrix corresponding to a pixel other than the pixel included in the input image.

The gamut mapping matrix may be determined by a linear combination of a first matrix expanding a color gamut of the input image to be displayed on an image display device to a color gamut of the image display device, a second matrix maintaining the color gamut of the input image to be displayed on the image display device, and a weight, and the weight may indicate a ratio of the first matrix to the second matrix in the gamut mapping matrix.

The generating of the gamut mapping matrix may include determining a weight corresponding to the hue value and the saturation value; and generating a gamut mapping matrix corresponding to the pixel based on the determined weight.

The determining of the weight may include determining that the weight increases as the saturation value increases.

The determining of the weight may include determining that the weight increases as a difference between first chromaticity coordinates in the color gamut of the input image and second chromaticity coordinates, which correspond to the first chromaticity coordinates, in the color gamut of the image display device increases.

The determining of the weight may include calculating the weight corresponding to the hue value and the saturation value of the pixel by performing bilinear interpolation based on weights corresponding to a plurality of hue values and a plurality of saturation values.

The image display method may further include storing weights corresponding to a plurality of hue values and a plurality of saturation values; and calculating the weight corresponding to the hue value and the saturation value of the pixel based on the stored weights corresponding to the plurality of hue values and the plurality of saturation values.

The first matrix and the second matrix may be generated based on chromaticity coordinates of primary colors and a reference white color in the color gamut of the input image and the color gamut of the image display device.

The first matrix may be an identity matrix.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which:

FIG. 3 is a flowchart of an image display method according to an exemplary embodiment;

FIG. 4 illustrates a process of calculating a weight according to a hue value and a saturation value in the image display device, according to an exemplary embodiment;

DETAILED DESCRIPTION

Figure 1:
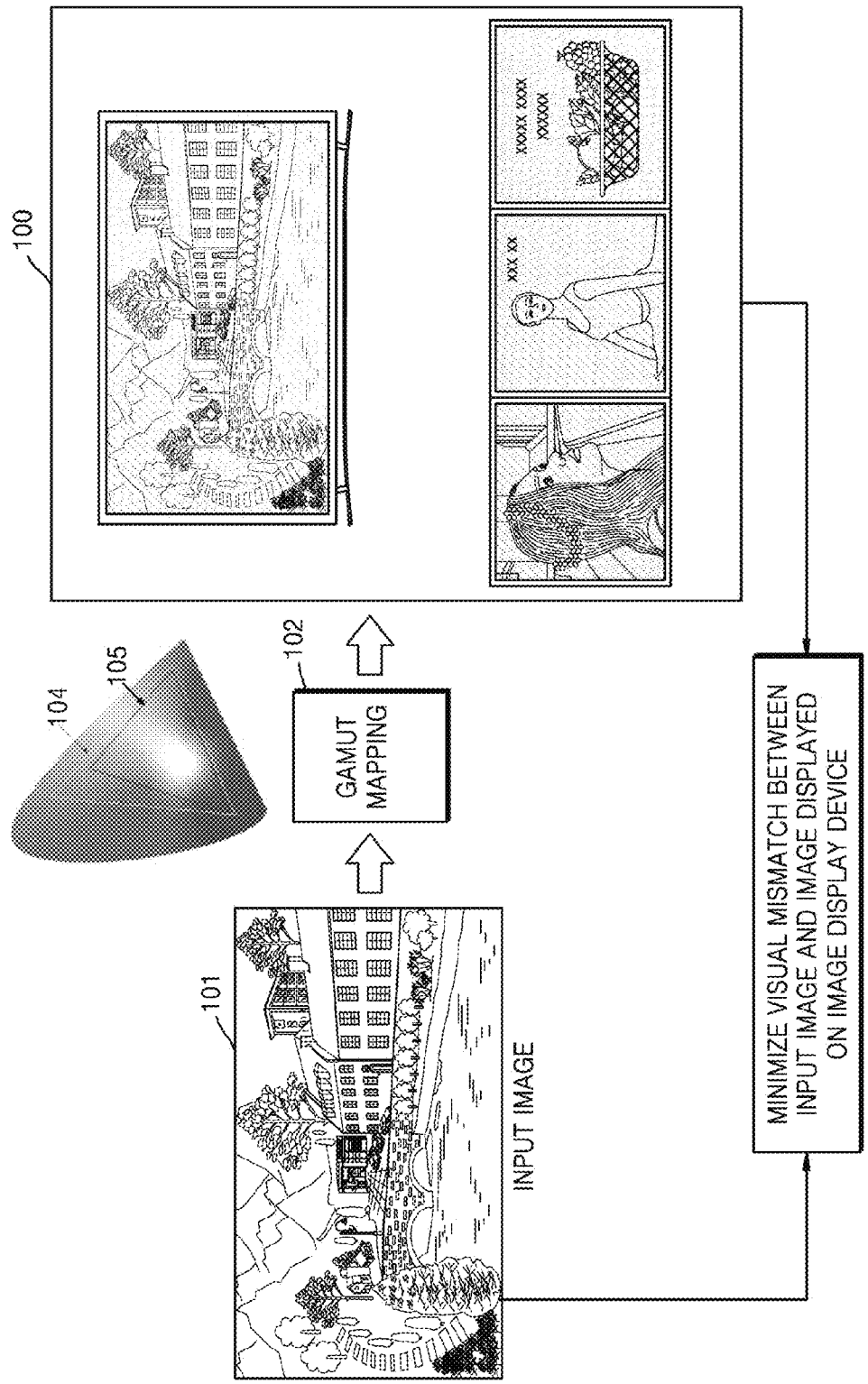
FIG. 1 illustrates an image display device according to an exemplary embodiment.

Reference will now be made in detail to embodiments, examples of which are illustrated in the accompanying drawings. In the drawings, parts irrelevant to the description are omitted to clearly describe the embodiments, and like reference numerals refer to like elements throughout the specification. In this regard, the present embodiments may have different forms and should not be construed as being limited to the descriptions set forth herein. Accordingly, the embodiments are merely described below, by referring to the figures, to explain aspects.

Some embodiments of the present disclosure can be represented with functional blocks and various processing steps. Some or all of these functional blocks can be implemented by various numbers of hardware and/or software configurations for executing specific functions.

In addition, connections or connection members of lines between components shown in the drawings illustrate functional connections and/or physical or circuit connections, and the connections or connection members can be represented by replaceable or additional various functional connections, physical connections, or circuit connections in an actual apparatus.

As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure is described in detail with reference to the accompanying drawings.

FIG. 1 illustrates an image display device 100 according to an exemplary embodiment.

The image display device 100 may display an input image 101. The image display device 100 may be a television (TV) as shown in FIG. 1, a digital signage, a desktop computer, a laptop computer, a cellular phone, or a tablet personal computer (PC) but is not limited thereto. The image display device 100 may be implemented by various types of electronic devices capable of displaying the input image 101.

Referring to FIG. 1, the image display device 100 and the input image 101 may have different color gamuts from each other. Color gamut indicates a renderable range of colors and may vary for each color space. For example, a color gamut of an sRGB color space and a color gamut of an Adobe RGB color space differ from each other, in detail, the color gamut of the Adobe RGB color space is wider than the color gamut of the sRGB color space. Therefore, when a color space supported by the image display device 100 differs from a color space of the input image 101, the image display device 100 and the input image 101 may have different color gamuts from each other. For example, as shown in FIG. 1, a color gamut 104 of the image display device 100 may be wider than a color gamut 105 of the input image 101, but the present embodiment is not limited thereto.

When the color gamut 104 of the image display device 100 differs from the color gamut 105 of the input image 101, to display the input image 101 on the image display device 100, a process of performing gamut mapping 102 may be required. The gamut mapping 102 may indicate a process of correcting colors of the input image 101 having the color gamut 105 different from the color gamut 104 of the image display device 100 to minimize visual mismatch between the input image and an image displayed on the image display device 100. For example, the image display device 100 may improve a color reproduction ability by mapping a value of a pixel included in the input image 101 to a value corresponding to the color gamut 104 of the image display device 100.

The image display device 100 may perform the gamut mapping 102 by using a look-up table (LUT) or a gamut mapping matrix.

A method of performing the gamut mapping 102 by using an LUT may indicate a method of performing the gamut mapping 102 by storing, in an LUT form, mapping values for a plurality of points in the color gamut 105 of the input image 101 and interpolating the stored mapping values. When the LUT is used, the image display device 100 may effectively perform the gamut mapping 102 even when a relationship between the color gamut 104 of the image display device 100 and the color gamut 105 of the input image 101 cannot be linearly mapped. The more the number of stored mapping values is, the more the image display device 100 may improve the color reproduction ability. However, when a size of the LUT increases, a large capacity of storage space is required, and a calculation complexity may increase.

A method of performing the gamut mapping 102 by using a gamut mapping matrix may indicate a method of performing the gamut mapping 102 through a product operation based on the gamut mapping matrix. The gamut mapping matrix may be generated based on chromaticity coordinates of primary colors and a reference white color in the color gamut 104 of the image display device 100 and the color gamut 105 of the input image 101. The primary colors may include red (R), green (G), blue (B), and the like.

When the gamut mapping 102 is performed by using a gamut mapping matrix, since the image display device 100 may perform the gamut mapping 102 through a product operation of matrices, this method may have a low calculation complexity, may be easily implemented, and may need a small capacity of a required storage space. However, it may be more difficult to improve a color reproduction ability when the gamut mapping 102 is performed by using a gamut mapping matrix than when the gamut mapping 102 is performed by using an LUT.

Figure 2:
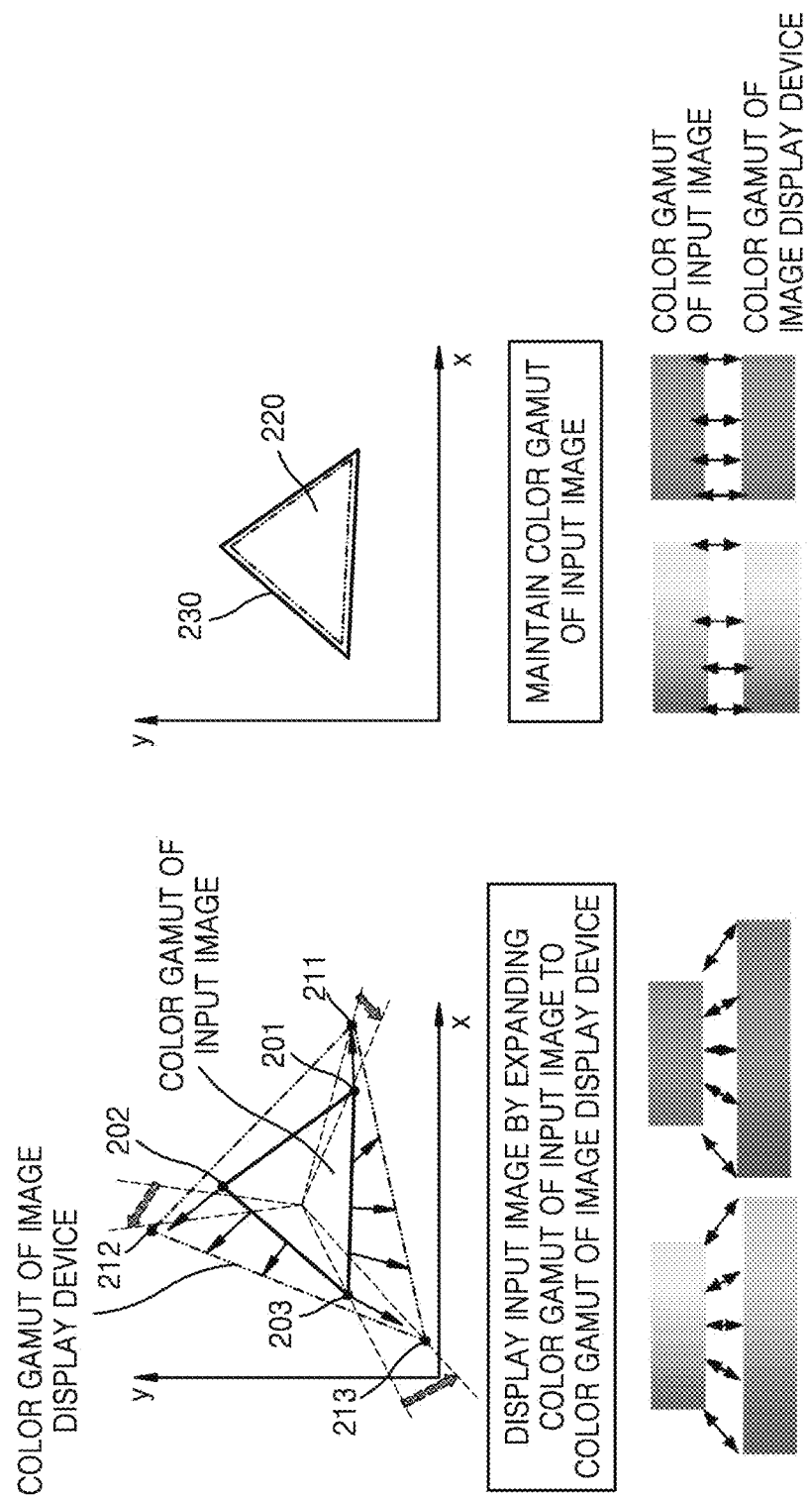
FIG. 2 illustrates gamut mapping.

FIG. 2 illustrates gamut mapping using a gamut mapping matrix.

As described above, the image display device 100 may perform gamut mapping through a product operation of a gamut mapping matrix.

The image display device 100 may perform gamut mapping by using gamut mapping matrices such that a color gamut of an input image is linearly expanded to a color gamut of the image display device 100. For example, with reference to FIG. 2, R 201, G 202, and B 203 in the color gamut of the input image may be mapped to R 211, G 212, and B 213 in the color gamut of the image display device 100. Accordingly, the color gamut of the input image to be displayed on the image display device 100 may be the same as the color gamut of the image display device 100.

When the color gamut of the input image is linearly expanded to the color gamut of the image display device 100, a hue value may be changed, and a saturation value may increase. A hue value may be represented by an angle greater than or equal to 0° and less than 360°, for example, red (R), yellow (Y), green (G), cyan (C), blue (B), magenta (M) may be represented as 0°, 60°, 120°, 180°, 240°, and 300°, respectively. A saturation value may be represented as a percentage of 0% to 100%, and a color may be clear as a saturation value increases. Along with the change in the hue value and the increase in the saturation value, colors of the input image may be distorted and displayed, and thus the input image may be unnaturally represented in view of a user. Particularly, color distortion may be large in a region having a large hue value difference between the color gamut of the image display device 100 and the color gamut of the input image. For example, color distortion may increase as a difference between first chromaticity coordinates in the color gamut of the input image and second chromaticity coordinates, which correspond to the first chromaticity coordinates, in the color gamut of the image display device 100 increases.

Alternatively, the image display device 100 may perform gamut mapping by using a gamut mapping matrix such that a color gamut of an input image is maintained as it is. For example, with reference to FIG. 2, the image display device 100 may perform gamut mapping such that a color gamut 220 of an input image is the same as a color gamut 230 of the image display device 100. Accordingly, the image display device 100 may represent the input image without color distortion. However, when the color gamut 220 of the input image is maintained as it is, a saturation value increasing effect is reduced than when a color gamut of the input image is expanded to a color gamut of the image display device 100, and thus it is difficult for the image display device 100 to more clearly represent the input image.

Therefore, there is a demand of a method capable of representing an input image without color distortion while using a color gamut of the image display device 100, which is wider than a color gamut of the input image, when gamut mapping using a gamut mapping matrix is performed.

According to various exemplary embodiments, an input image may be clearly represented without color distortion by changing a value of a pixel included in the input image based on a hue value and a saturation value of the pixel. In addition, according to various exemplary embodiments, gamut mapping is performed by using a gamut mapping matrix, thereby reducing a calculation complexity in the gamut mapping and reducing a capacity of a memory required for the gamut mapping.

FIG. 3 is a flowchart of an image display method according to an exemplary embodiment.

In operation S310, the image display device 100 may change a value of a pixel included in an input image based on a hue value and a saturation value of the pixel.

For example, the image display device 100 may generate a gamut mapping matrix corresponding to a pixel included in an input image based on a hue value and a saturation value of the pixel. Thereafter, the image display device 100 may change a value of the pixel by using the generated gamut mapping matrix. The image display device 100 may apply a different gamut mapping matrix to each pixel included in the input image.

The gamut mapping matrix corresponding to the pixel may be determined by a linear combination of a first matrix expanding a color gamut of the input image to be displayed on the image display device 100 to a color gamut of the image display device 100, a second matrix maintaining the color gamut of the input image to be displayed on the image display device 100, and a weight.

The weight may indicate a ratio of the first matrix to the second matrix in the gamut mapping matrix and may have a value of 0 to 1 inclusive.

The first matrix and the second matrix may be generated based on chromaticity coordinates of R, G, B, and reference white of the input image and chromaticity coordinates of R, G, B, and reference white of the image display device 100. For example, when a color space of the image display device 100 is Adobe RGB, and a color space of the input image is sRGB, the chromaticity coordinates of R, G, B, and reference white of the input image and the chromaticity coordinates of R, G, B, and reference white of the image display device 100 may be indicated by Table 1.

TABLE 1

| Color Space | sRGB | | Adobe RGB | |
| --- | --- | --- | --- | --- |
| | x | y | x | y |
| Red | 0.6400 | 0.3300 | 0.6400 | 0.3300 |
| Green | 0.3000 | 0.6000 | 0.2100 | 0.7100 |
| Blue | 0.1500 | 0.0600 | 0.1500 | 0.0600 |
| Reference White | 0.3457 | 0.3585 | 0.3127 | 0.3290 |

Chromaticity coordinates of R, G, B, and reference white may vary according to color spaces and are not limited to the example described above.

The first matrix may be represented by a 3×3 identity matrix but may vary according to exemplary embodiments. The second matrix may vary according to a color space of an input image and a color space of an image display device. For example, when the color space of the input image is sRGB, and the color space of the image display device 100 is Adobe RGB, the second matrix may be represented by [0.7151 0.2849 0;0 1 0;0 0.0412 0.9588]. A process of determining a second matrix according to a color space of an input image and a color space of an image display device is well known to those of ordinary skill in the art, and thus a detailed description thereof is omitted.

A gamut mapping matrix $M_{out}$ according to an exemplary embodiment may be represented as below but is not limited thereto.

$$M_{out} = k \cdot M_1 + (1-k) \cdot M_2$$

In Equation 1, $M_1$ denotes the first matrix, $M_2$ denotes the second matrix, and k denotes the weight. Referring to Equation 1, when the weight k is 0, the gamut mapping matrix $M_{out}$ is the same as the second matrix. Therefore, when the weight k is 0, the image display device 100 maintains the color gamut of the input image to be displayed on the image display device 100. When the weight k is 1, the gamut mapping matrix $M_{out}$ is the same as the first matrix. Therefore, when the weight k is 1, the image display device 100 expands the color gamut of the input image to be displayed on the image display device 100 to the color gamut of the image display device 100.

The image display device 100 may calculate a hue value and a saturation value of a pixel included in the input image and determine a weight corresponding to the pixel based on the calculated hue value and saturation value. The image display device 100 may calculate different hue values and saturation values of a pixel according to color spaces of an input image and the hardware performance (for example, a memory capacity and the performance of a processor) of the image display device 100. For example, the image display device 100 may calculate different hue values and saturation values when a color space of an input image is RGB and when the color space of the input image is YCbCr. In addition, the image display device 100 may calculate a hue value and a saturation value of a pixel by applying a formula having a low calculation complexity in consideration of the hardware performance of the image display device 100. A process of calculating a hue value and a saturation value of a pixel is described below with reference to FIG. 4.

The image display device 100 may calculate the weight corresponding to the hue value and the saturation value of the pixel based on weights corresponding to a plurality of hue values and a plurality of saturation values. For example, the image display device 100 may calculate the weight corresponding to the hue value and the saturation value of the pixel by performing bilinear interpolation based on the weights corresponding to the plurality of hue values and the plurality of saturation values but is not limited thereto.

The image display device 100 may determine and store in advance the weights corresponding to the plurality of hue values and the plurality of saturation values. The weights corresponding to the plurality of hue values and the plurality of saturation values may be stored in an LUT form, and the number of stored weights may vary according to exemplary embodiments. A detailed description of the weights corresponding to the plurality of hue values and the plurality of saturation values will be made below with reference to FIGS. 5A and 5B.

The image display device 100 according to an exemplary embodiment may change a value of a pixel by using a product operation of a matrix $[R_{in} \ G_{in} \ B_{in}]$ indicating an RGB value of the pixel and the gamut mapping matrix $M_{out}$. When a color of each pixel is represented by eight bits, $R_{in}$, $G_{in}$, and $B_{in}$ values forming the RGB value of the pixel may have a value of 0 to 255 inclusive. Alternatively, when a color of each pixel is represented by ten bits, $R_{in}$, $G_{in}$, and $B_{in}$ values may have a value of 0 to 1023 inclusive.

RGB values of pixels included in an input image may be a nonlinear signal to which gamma is applied. When a product operation is performed on the nonlinear signal, a value of a pixel may be changed to an unintended value. Therefore, the image display device 100 may perform a linearization process on RGB values of pixels included in an input image before performing a product operation. Accordingly, the image display device 100 may acquire a linear RGB value $[R_{lin} \ G_{lin} \ B_{lin}]$ and accurately change a value of a pixel through a product operation of a matrix indicating the linear RGB value and the gamut mapping matrix $M_{out}$. A process of converting a gamma-applied nonlinear signal into a linear signal is well known to those of ordinary skill in the art, and thus a detailed description thereof is omitted. A process of changing a value of a pixel by using the gamut mapping matrix $M_{out}$ may be represented by Equation 2.

$$\begin{bmatrix} R_{out} \\ G_{out} \\ B_{out} \end{bmatrix} = M_{out} \cdot \begin{bmatrix} R_{lin} \\ G_{lin} \\ B_{lin} \end{bmatrix} = \begin{bmatrix} m_{11} m_{12} m_{13} \\ m_{21} m_{22} m_{23} \\ m_{31} m_{32} m_{33} \end{bmatrix} \cdot \begin{bmatrix} R_{lin} \\ G_{lin} \\ B_{lin} \end{bmatrix} \quad (2)$$

In operation S320, the image display device 100 may display the image in which the value of the pixel has been changed.

A gamut mapping matrix according to an exemplary embodiment may be determined based on a hue value and a saturation value of a pixel. Therefore, a gamut mapping matrix to be applied may vary according to where a color of a pixel is located in a color gamut of an input image. Accordingly, the image display device 100 may represent the input image without color distortion. In addition, since the image display device 100 can represent the input image by using the color gamut of the image display device 100, which is wider than the color gamut of the input image, the image display device 100 may represent the input image more clearly than when the color gamut of the input image is used as it is. In addition, since a 3×3-matrix product operation is used, even when a hardware specification of the image display device 100 is restricted (for example, a memory capacity is small), the image display device 100 may perform gamut mapping.

The image display device 100 may differently calculate a hue value and a saturation value of a pixel in consideration of a color space of an input image and the hardware specification of the image display device 100.

For example, the image display device 100 may calculate a hue value and a saturation value of a pixel by applying different formulae when a color space of an input image is RGB and when the color space of the input image is YCbCr. For example, when the color space of the input image is RGB, the image display device 100 may calculate a hue value of a pixel according to Equation 3 but is not limited thereto.

$$H' = \begin{cases} \text{undefined}, & \text{if } C = 0 \\ \frac{G-B}{C} \bmod 6, & \text{if } M = R \\ \frac{B-R}{C} + 2, & \text{if } M = G \\ \frac{R-G}{C} + 4, & \text{if } M = B \end{cases}, H = 60° \times H', \quad (3)$$

where $$\begin{cases} M = \max(R, G, B) \\ m = \min(R, G, B) \\ C = M - m \end{cases}$$

In addition, when the color space of the input image is RGB, the image display device 100 may calculate a saturation value of the pixel according to Equation 4.

$$S = \frac{(\max(R, G, B) - \min(R, G, B))}{\max(R, G, B)} \quad (4)$$

Alternatively, when the color space of the input image is YCbCr, the image display device 100 may calculate the hue value of the pixel according to Equation 5.

$$H = \tan^{-1}(Cr/Cb) \quad (5)$$

In addition, when the color space of the input image is YCbCr, the image display device 100 may calculate the saturation value of the pixel according to Equation 6.

$$S = \sqrt{Cb^2 Cr^2} \quad (6)$$

The image display device 100 may apply a formula having a relatively small computation amount in consideration of the hardware specification of the image display device 100. For example, when the color space of the input image is YCbCr, the saturation value of the pixel may be calculated according to Equation 6 or 7.

$$S = |Cb| + |Cr| \quad (7)$$

Since a computation amount of Equation 7 is less than a computation amount of Equation 6, the image display device 100 may calculate the saturation value of the pixel by applying Equation 7 to reduce a calculation complexity. The formulae applied to calculate the hue value and the saturation value of the pixel are not limited thereto and may vary according to exemplary embodiments.

FIG. 4 illustrates a process of calculating a weight according to a hue value and a saturation value in the image display device 100 according to an exemplary embodiment.

The image display device 100 may calculate a weight corresponding to a hue value and a saturation value of a pixel based on weights corresponding to a plurality of hue values and a plurality of saturation values.

The image display device 100 may determine in advance the weights corresponding to the plurality of hue values and the plurality of saturation values. For example, as shown in FIG. 4, the image display device 100 may store in advance 48 weights 410 corresponding to six hue values ($H_1$ to $H_6$) and eight saturation values ($S_1$ to $S_8$) 400 having a certain interval. For example, the image display device 100 may store in advance the 48 weights 410 corresponding to six hue values (for example, 0°, 60°, 120°, 180°, 240°, and 300°) and eight saturation values (for example, 12.5%, 25%, 37.5%, 50%, 62.5%, 75%, 87.5%, and 100%) 400, the six hue values being determined in an interval of 60° with respect to hue values including an angle greater than or equal to 0° and less than 360°, and the eight saturation values being determined in an interval of 12.5% with respect to hue values including 0% to 100%. With reference to FIG. 4, the 48 weights 410 corresponding to the six hue values and the eight saturation values 400 may be represented by Gain_$H_1 S_1$ to Gain_$H_6 S_8$.

The weights 410 may have values of 0 to 1 inclusive. As a value of a weight is close to 1, the image display device 100 may expand a color gamut of an input image to the color gamut of the image display device 100. Alternatively, as a value of a weight is close to 0, the image display device 100 may maintain a color gamut of an input image to be displayed on the image display device 100 as it is. Therefore, image display device 100 may apply a different gamut mapping matrix to each pixel included in an input image by setting a different weight according to a hue value and a saturation value of the pixel. Accordingly, the image display device 100 may represent the input image without color distortion even when using the color gamut of the image display device 100, which is wider than a color gamut of the input image.

The number of the pre-stored weights 410 may vary according to exemplary embodiments. The more the number of the stored weights 410 increases, the more the image display device 100 may improve a color reproduction ability by performing gamut mapping according to a hue value and a saturation value of a pixel. In addition, the pre-stored weights 410 may be stored in an LUT form.

The image display device 100 may calculate a weight corresponding to a hue value and a saturation value of a pixel based on the plurality of pre-stored weights 410. The image display device 100 may calculate a weight corresponding to a hue value and a saturation value of a pixel by performing bilinear interpolation 420 on the weights 410 corresponding to the plurality of hue values and the plurality of saturation values but is not limited thereto. For example, when a hue value of a pixel is an intermediate value (($H_1 + H_2$)/2) of $H_1$ and $H_2$, and a saturation value thereof is an intermediate value (($S_5 + S_6$)/2) of $S_5$ and $S_6$, the image display device 100 may calculate a weight corresponding to the hue value (($H_1 + H_2$)/2) and the saturation value (($S_5 + S_6$)/2) of the pixel by performing the bilinear interpolation 420 on the pre-stored weights Gain_$H_1 S_1$ to Gain_$H_6 S_8$ 410.

Figure 5A:
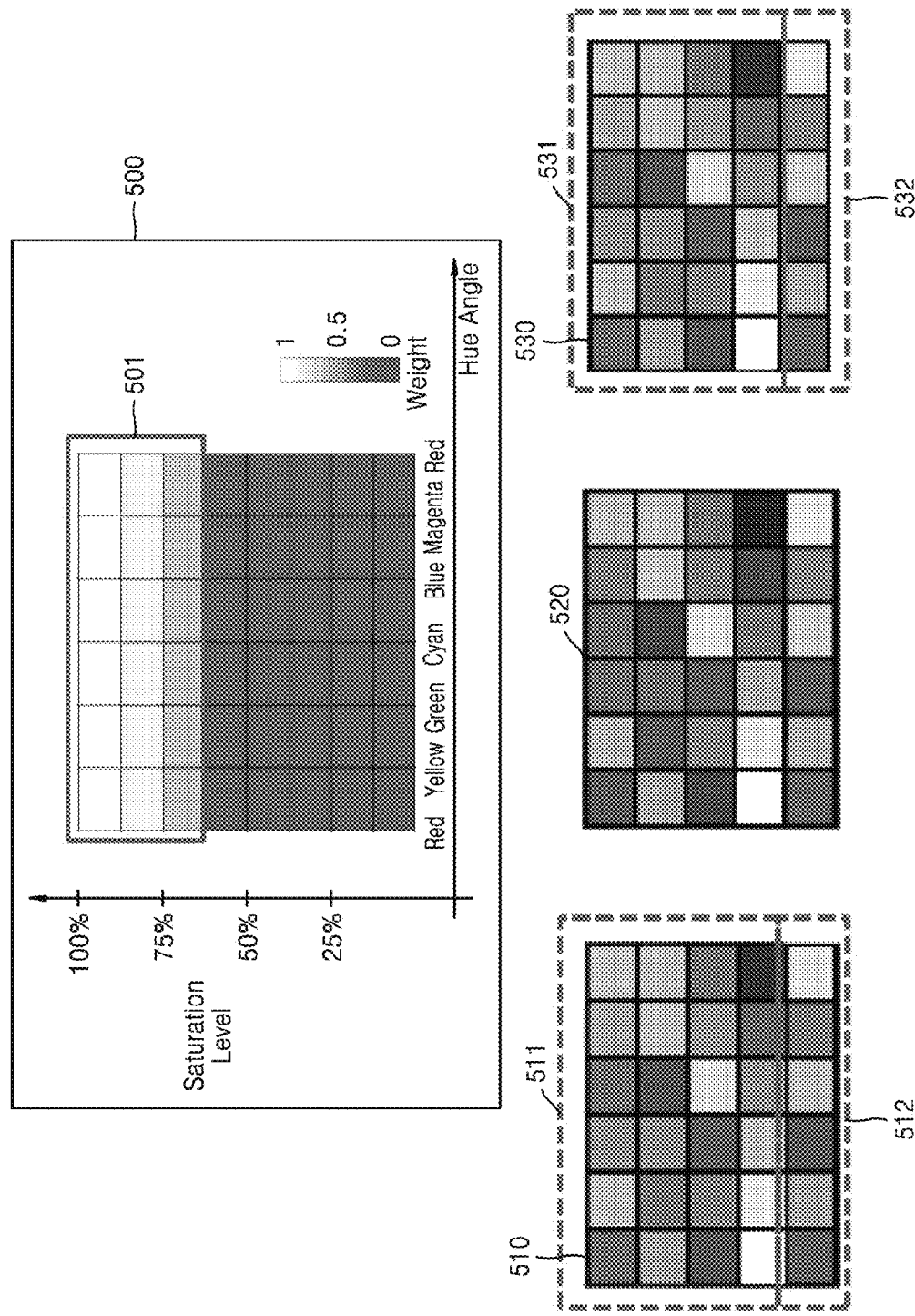
FIGS. 5A and 5B show an example of determining a weight in the image display device, according to an exemplary embodiment.
Figure 5B:
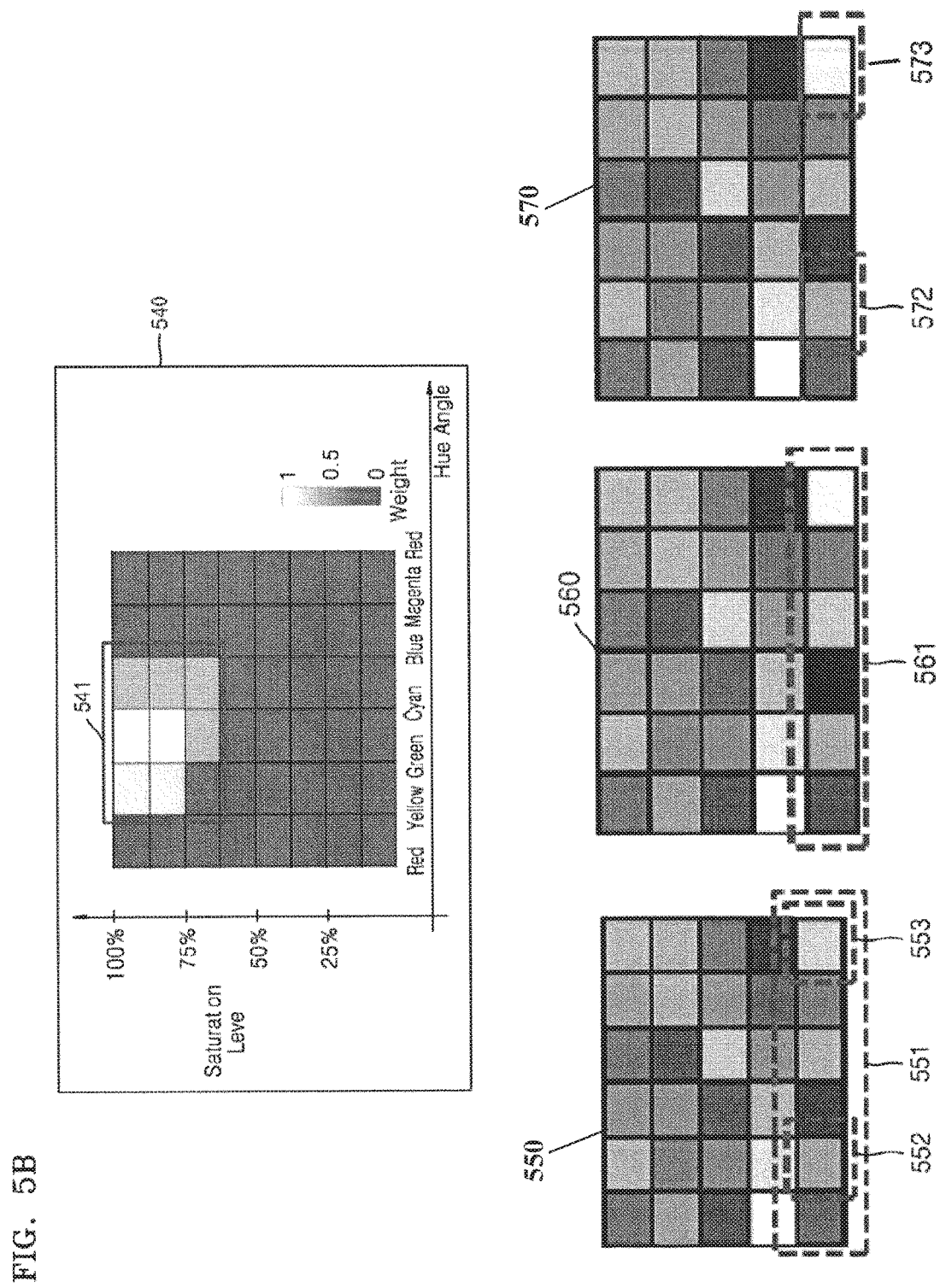

FIGS. 5A and 5B show an example of determining a weight in the image display device 100 according to an exemplary embodiment.

The image display device 100 may determine the weight to be larger as a saturation value of a pixel is higher as shown in the graph 500 of FIG. 5A. As described above, the weight may have a value of 0 to 1 inclusive. For example, the image display device 100 may determine the weight as 0 when the saturation value is less than a threshold value (for example, 62.5%) and determine the weight as a value greater than 0 when the saturation value is greater than the threshold value (501). For example, referring to the graph 500 shown in FIG. 5A, the image display device 100 may determine the weight as 0.5 when the saturation value is 62.5% or more and less than 75%, determine the weight as 0.75 when the saturation value is 75% or more and less than 87.5%, and determine the weight as 1 when the saturation value is 87.5% or more. In addition, the image display device 100 may determine the weight as 0 when the saturation value is less than 62.5%. Therefore, the image display device 100 may apply a different gamut mapping matrix to each pixel included in an input image according to a saturation value of the pixel.

A color having a high saturation value may be clearer than a color having a low saturation value. The image display device 100 may more clearly represent a color having a saturation value greater than or equal to the threshold value in the input image by determining the weight to be larger as the saturation value is higher. In addition, for a color having a saturation value less than the threshold value, the image display device 100 may maintain the color gamut of the input image to be displayed on the image display device 100.

Referring to FIG. 5A, the image display device 100 may perform gamut mapping on an input image 510 shown in the left.

An output image 520 shown in the middle indicates a result obtained by linearly expanding the color gamut of the input image to the color gamut of the image display device 100. For example, the image display device 100 may perform gamut mapping by applying the first matrix to all the pixels regardless of hue values and saturation values of the pixels. Accordingly, saturation values of colors 511 of which saturation values are relatively low in the input image are also increased, and thus the input image may be unnaturally represented. In addition, when the color gamut of the input image is linearly expanded to the color gamut of the image display device 100, hue values are also changed, and thus a color of the input image may be distorted.

An output image 530 shown in the right indicates a case in which a weight is determined to be larger as a saturation value is higher as shown in the graph 500 of FIG. 5A.

Since a weight is determined to be larger as a saturation value is higher, for a region 512 having a high saturation value in the input image 510, a ratio of the first matrix in the gamut mapping matrix $M_{out}$ may be large. Therefore, a color gamut of the region 512 having a high saturation value is expanded to the color gamut of the image display device 100, and thus the region 512 having a high saturation value may be more clearly represented, as shown in a corresponding region 532 in the output image 530. In addition, for a region 511 having a low saturation value in the input image 510, a ratio of the second matrix in the gamut mapping matrix $M_{out}$ may be large. Therefore, for the region 511 having a low saturation value, the color gamut of the input image 510 is maintained, and thus a color of the input image 510 may be reproduced as it is, as shown in a corresponding region 531 in the output image 530.

The image display device 100 may determine a weight to be large for a region in which hue values are within a certain range. For example, the image display device 100 may determine a weight to be large for hue values of which a characteristic difference between the color gamut of the image display device 100 and a color gamut of an input image is large. For example, a characteristic difference between sRGB and Adobe RGB is larger in a region corresponding to green (G) than in a region corresponding to red (R) and blue (B) since Adobe RGB can represent a wider region than sRGB for a region corresponding to green (G) and cyan (C). Therefore, when a color space of an input image is sRGB, and the color space of the image display device 100 is Adobe RGB, the image display device 100 may determine a weight to be large for a region corresponding to green (G).

The image display device 100 may determine a weight to be larger as a difference between first chromaticity coordinates in the color gamut of the input image and second chromaticity coordinates, which correspond to the first chromaticity coordinates, in the color gamut of the image display device 100 is larger.

For example, referring to a graph 540 shown in FIG. 5B, the image display device 100 may differentially apply a weight to a region 541 (for example, a region in which a hue value corresponds to 60° to 240°) corresponding to yellow (Y) to blue (B). Referring to FIG. 5B, the image display device 100 may determine, as 1, a weight of a region in which a saturation value is 75% or more in a region (region in which a hue value corresponds to 120° to 180°) corresponding to green (G) to cyan (C). In addition, the image display device 100 may determine, as a value greater than 0 and less than 1, a weight of a region in which a saturation value is 62.5% or more and less than 75% in the region corresponding to green (G) to cyan (C). In addition, the image display device 100 may determine, as a value greater than 0 and less than 1, a weight of a region in which a saturation value is 75% or more in a region corresponding to yellow (Y) to green (G) and a weight of a region in which a saturation value is 62.5% or more in a region corresponding to cyan (C) to blue (B).

Referring to FIG. 5B, the image display device 100 may perform gamut mapping on an input image 550 shown in the left.

An output image 560 shown in the middle indicates an example in which a weight is determined to be large as a saturation value is high, as shown in the graph 500 of FIG. 5A. Therefore, a region 551 of which a saturation value is high in the input image 550 has an increased saturation value regardless of a hue value due to expansion to the color gamut of the image display device 100, and thus a region 561 in the output image 560, which corresponds to the region 551, may be displayed more clearly than the input image 550.

An output image 570 shown in the right indicates an example in which a weight is determined to be large for a region in which a hue value is within a certain range, as shown in the graph 540 of FIG. 5B. Referring to FIG. 5B, the image display device 100 may expand a color gamut of the input image 550 to the color gamut of the image display device 100 for only regions 552 and 553 of which a weight is determined to be large. Accordingly, the image display device 100 may more clearly display the regions 552 and 553 (regions 572 and 573 in the output image 570) having specific hue values in the region 551 of which a saturation value is high in the input image 550 than the input image 550.

Figure 6:
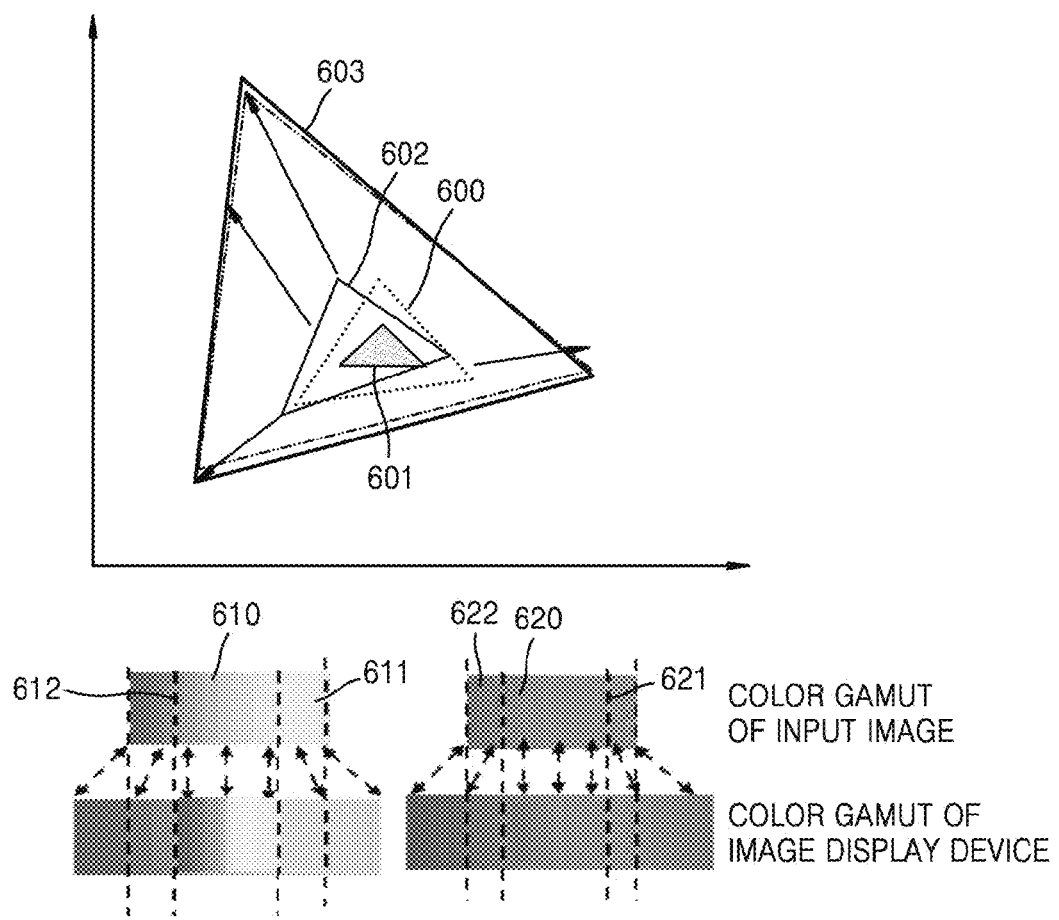
FIG. 6 illustrates a gamut mapping result according to an exemplary embodiment.

FIG. 6 illustrates a gamut mapping result according to an exemplary embodiment.

As described above, the image display device 100 may apply a different gamut mapping matrix according to a hue value and a saturation value of a pixel. Therefore, different gamut mapping matrices may be applied according to locations of colors of pixels in a color gamut of an input image.

Referring to FIG. 6, different gamut mapping matrices 601, 602, and 603 may be applied according to locations of colors of pixels in a color gamut 600 of an input image. For example, a weight of a region in which a saturation value is relatively low in the input image may be set to 0. Therefore, since the gamut mapping matrix $M_{out}$ is the same as the second matrix $M_2$, the color gamut 600 of the input image may be maintained as it is (601). A weight of a region in which a saturation value is relatively high in the input image may be set to 1. Therefore, since the gamut mapping matrix $M_{out}$ is the same as the first matrix $M_1$, the color gamut 600 of the input image may be linearly expanded to the color gamut of the image display device 100 (603). In addition, a region in which a weight is set to a value greater than 0 and less than 1 may have the gamut mapping matrix $M_{out}$ which is generated by a linear combination of the first matrix $M_1$ and the second matrix $M_2$. Therefore, the color gamut 600 of the input image may be partially expanded (602).

In addition, as shown in FIG. 6, the image display device 100 may reproduce colors of the input image as they are for regions 610 and 620 in which a saturation value is low. In addition, the image display device 100 may more clearly display regions 611, 612, 621, and 622 in which a saturation value is high than the input image by using the wide color gamut of the image display device 100.

Therefore, the image display device 100 according to the exemplary embodiments described above may improve a color reproduction ability more than when gamut mapping is performed by generally applying the first matrix or the second matrix to all pixels. In addition, the image display device 100 according to the exemplary embodiments described above may perform gamut mapping through a simple 3×3-matrix product operation, and thus a calculation complexity may be reduced, and the image display device 100 may be implemented with a small capacity of memory.

Figure 7:
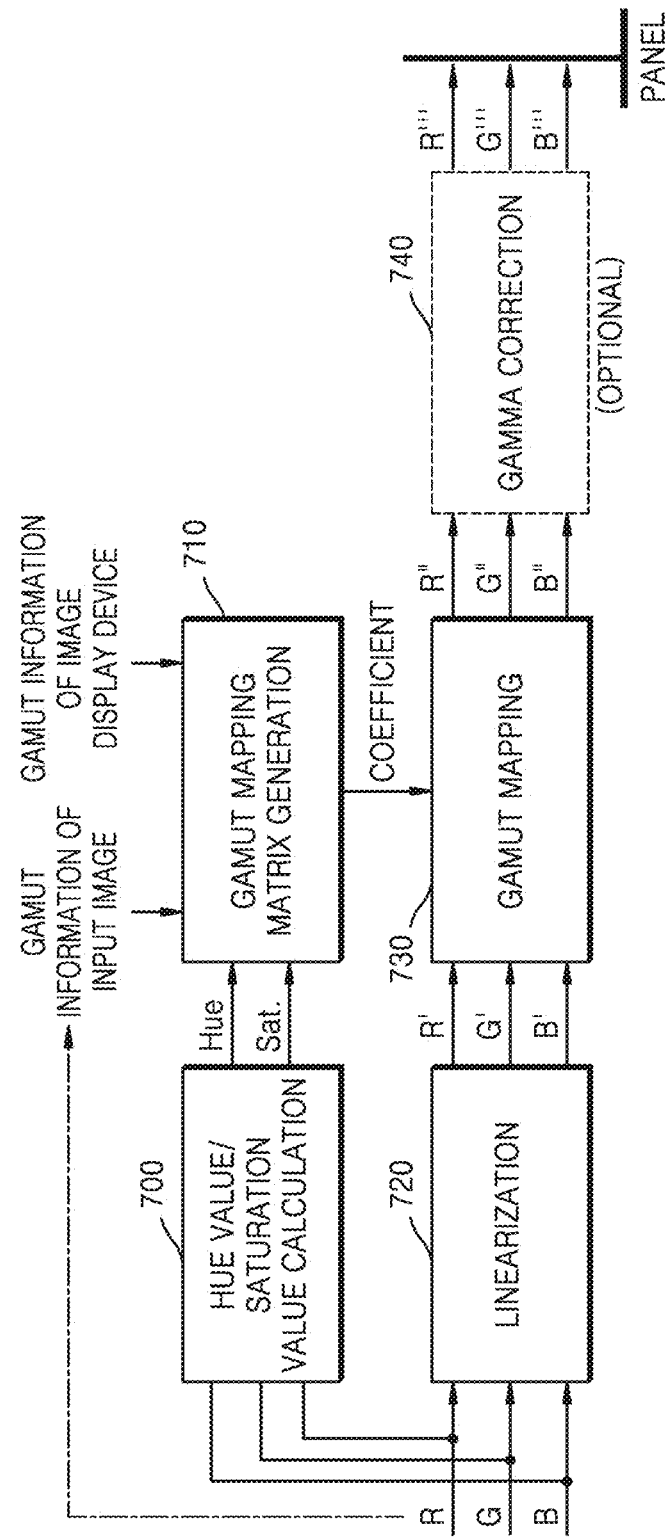
FIG. 7 is a signaling diagram of an image display method according to another exemplary embodiment.

FIG. 7 is a signaling diagram of an image display method according to another exemplary embodiment.

In operation 700, the image display device 100 may calculate a hue value and a saturation value from an RGB value of a pixel. The hue value and the saturation value may be calculated by various methods in consideration of a color space of an input image and the hardware specification of the image display device 100.

In operation 710, the image display device 100 may generate a gamut mapping matrix corresponding to the hue value and the saturation value based on the hue value and the saturation value, gamut information of the input image, and gamut information of the image display device 100. The gamut information of the input image and the gamut information of the image display device 100 may include chromaticity coordinates of red (R), green (G), blue (B), and reference white. The gamut mapping matrix may be generated by a linear combination of a first matrix, a second matrix, and a weight. The first matrix and the second matrix may be determined based on the gamut information of the input image and the gamut information of the image display device 100, and the weight may be determined based on the calculated hue value and saturation value.

In operation 720, the image display device 100 may perform a linearization process on the input image. The input image may be a gamma-applied nonlinear signal. Therefore, when the gamut mapping matrix is applied to the nonlinear signal, a gamut mapping process may not be accurately performed. Therefore, the image display device 100 may acquire a linear signal by performing the linearization process on an RGB value of the input image before performing a product operation using the gamut mapping matrix.

In operation 730, the image display device 100 may perform gamut mapping by performing a 3×3-matrix product operation on a matrix [R' G' B'] indicating the linear RGB value of the input image and the gamut mapping matrix. The image display device 100 may acquire an RGB value R", G", and B" in the mapped color gamut through the 3×3-matrix product operation.

In operation 740, the image display device 100 may perform gamma correction on the acquired RGB value R", G", and B" and display the gamma-corrected result through a display.

Each of the steps of the image display method disclosed in FIG. 7 may be performed by an image display device including a processor capable of image processing and a display. For example, each of the steps of the image display method disclosed in FIG. 7 may be performed by a controller 110 (see FIG. 8) of the image display device 100.

Figure 8:
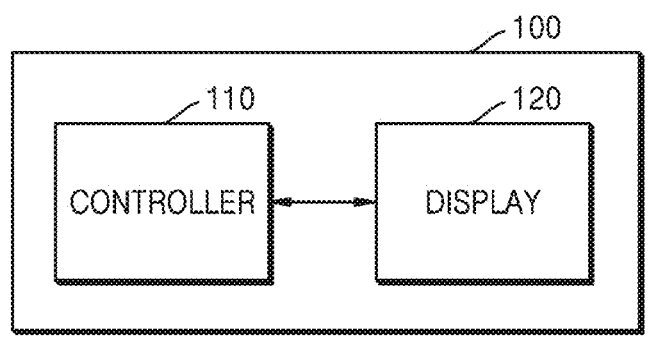
FIG. 8 is a block diagram of the image display device according to an exemplary embodiment.

FIG. 8 is a block diagram of the image display device 100 according to an exemplary embodiment.

Referring to FIG. 8, the image display device 100 may include the controller 110 and a display 120. However, the image display device 100 may be implemented by more components than the shown components and is not limited to the example described above.

Hereinafter, the components are sequentially described.

The controller 110 changes a value of a pixel included in an input image based on a hue value and a saturation value of the pixel.

For example, the controller 110 may generate a gamut mapping matrix corresponding to the pixel included in the input image based on the hue value and the saturation value of the pixel. In addition, the controller 110 may change the value of the pixel by using the generated gamut mapping matrix.

The gamut mapping matrix may be determined by a linear combination of a first matrix expanding a color gamut of the input image to be displayed on the image display device 100 to the color gamut of the image display device 100, a second matrix maintaining the color gamut of the input image to be displayed on the image display device 100, and a weight, and the weight may indicate a ratio of the first matrix to the second matrix in the gamut mapping matrix. The first matrix and the second matrix may be generated based on chromaticity coordinates of primary colors in the color gamut of the input image and the color gamut of the image display device 100. The first matrix may be a 3×3 identity matrix but is not limited thereto.

The controller 110 may determine a weight corresponding to the hue value and the saturation value of the pixel and generate a gamut mapping matrix corresponding to the pixel based on the determined weight. The weight may have a value of 0 to 1 inclusive.

The controller 110 may determine the weight corresponding to the hue value and the saturation value of the pixel based on weights corresponding to a plurality of hue values and a plurality of saturation values. For example, the controller 110 may determine the weight corresponding to the hue value and the saturation value of the pixel by performing bilinear interpolation based on the weights corresponding to the plurality of hue values and the plurality of saturation values.

The controller 110 may determine the weight to be larger as a saturation value is higher and determine the weight to be large for a region in which a hue value is within a certain range.

The controller 110 may change the value of the pixel by using a product operation of a matrix indicating an RGB value of the pixel and the gamut mapping matrix. The input image may be a gamma-applied nonlinear signal. Therefore, the controller 110 may acquire a linear RGB value by linearizing the RGB value of the input image and change the value of the pixel by using a product operation of the linear RGB value and the gamut mapping matrix. In addition, the controller 110 may control the display 120 such that the display 120 displays the image in which the value of the pixel has been changed.

The display 120 may display an image on which gamut mapping has been performed, under control of the controller 110.

When the display 120 and a touch pad form a layer structure to configure a touch screen, the display 120 may be used as not only an output device but also an input device. The display 120 may include at least one of a liquid crystal display, a thin-film transistor liquid crystal display, an organic light-emitting diode, a flexible display, a three-dimensional (3D) display, and an electrophoretic display. The image display device 100 may include two or more displays 120 according to an implementation form of the image display device 100. The two or more displays 120 may be arranged to face each other by using a hinge.

Figure 9:
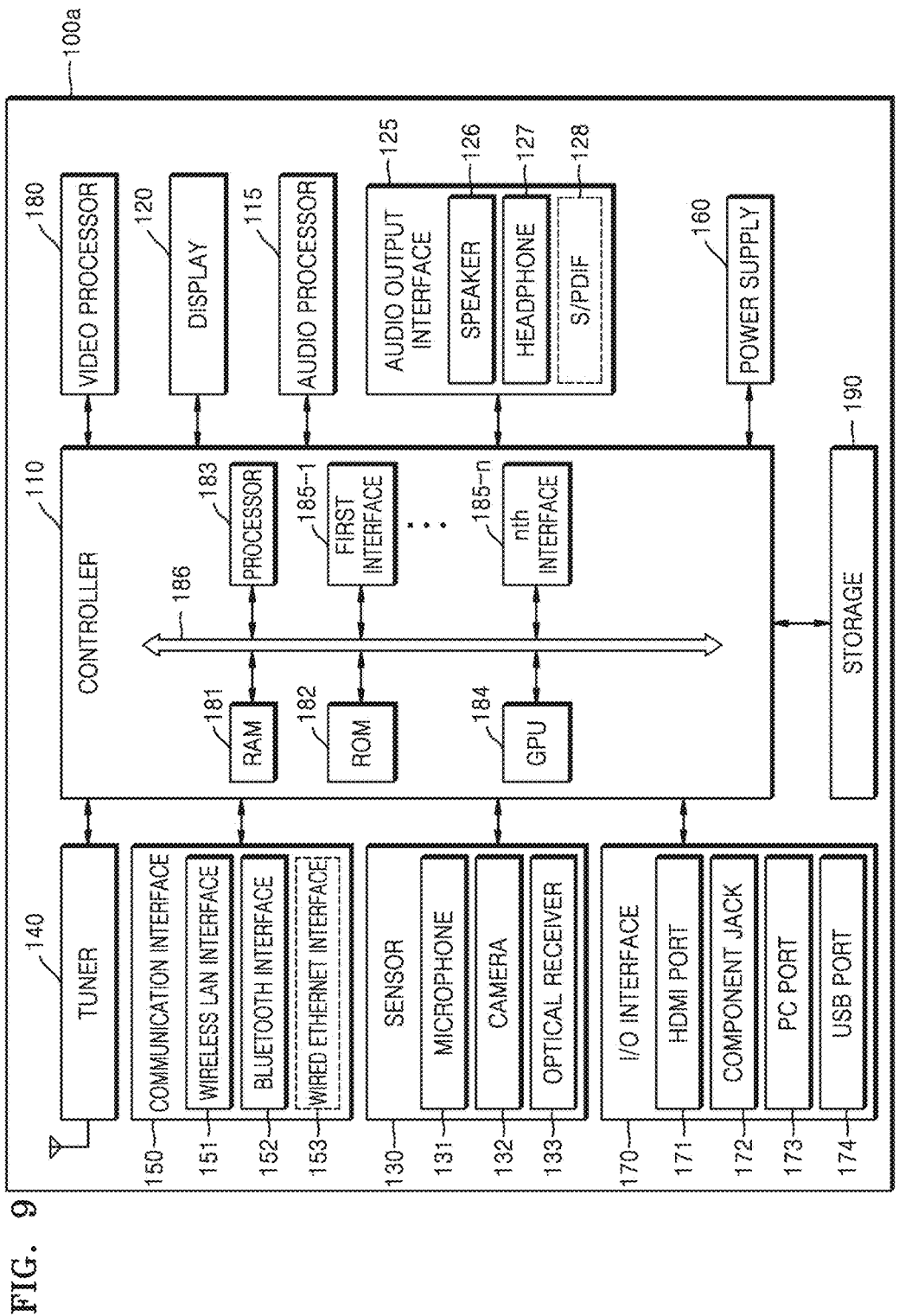
FIG. 9 is a block diagram of an image display device according to another exemplary embodiment.

FIG. 9 is a block diagram of an image display device 100a according to another exemplary embodiment.

The image display device 100a of FIG. 9 may be an exemplary embodiment of the image display device 100 of FIG. 8.

Referring to FIG. 9, the image display device 100a according to another exemplary embodiment may include a video processor 180, an audio processor 115, an audio output interface 125, a power supply 160, a tuner 140, a communication interface 150, a sensor 130, an input/output (I/O) interface 170, and a storage 190 besides the controller 110 and the display 120.

For the controller 110 and the display 120, the same description as described with reference to FIG. 8 is omitted herein.

The video processor 180 processes video data received by the image display device 100a. The video processor 180 may perform various types of image processing, such as decoding, scaling, noise filtering, frame rate conversion, and resolution conversion, on the video data.

The display 120 displays video included in a broadcast signal received through the tuner 140 on a screen under control of the controller 110. In addition, the display 120 may display content (e.g., video) input through the communication interface 150 or the I/O interface 170. The display 120 may display an image stored in the storage 190 under control of the controller 110. In addition, the display 120 may display a voice user interface (UI) (e.g., including a voice command guide) for performing a voice recognition task corresponding to voice recognition or a motion UI (e.g., including a user motion guide for motion recognition) for performing a motion recognition task corresponding to motion recognition.

The audio processor 115 processes audio data. The audio processor 115 may perform various types of processing, such as decoding, amplification, and noise filtering, on the audio data.

The audio output interface 125 outputs audio included in a broadcast signal received through the tuner 140, under control of the controller 110. The audio output interface 125 may output audio (e.g., a voice or sound) input through the communication interface 150 or the I/O interface 170. In addition, the audio output interface 125 may output audio stored in the storage 190, under control of the controller 110. The audio output interface 125 may include at least one of a speaker 126, a headphone output terminal 127, and a Sony/Philips digital interface (S/PDIF) output terminal 128.

The power supply 160 supplies power input from an external power source to the internal components 110 to 190 of the image display device 100a, under control of the controller 110. Alternatively, the power supply 160 may supply power input from one or more batteries (not shown) located inside the image display device 100a to the internal components 110 to 190, under control of the controller 110.

The tuner 140 may process a broadcast signal received in a wired or wireless manner by performing amplification, mixing, resonance, and the like and tune and select only a frequency of a channel which the image display device 100a desires to receive from among a number of received frequency components. The broadcast signal includes audio, video and additional information (e.g., electronic program guide (EPG)).

The tuner 140 may receive a broadcast signal in a frequency band corresponding to a channel number (e.g., a cable channel number 506) according to a user input (e.g., a control signal received from a control device, examples of the control signal are a channel number input, a channel up/down input, and a channel input on an EPG screen image).

The tuner 140 may receive broadcast signals from various sources such as terrestrial broadcasting stations, cable broadcasting stations, satellite broadcasting stations, and Internet broadcasting stations. The tuner 140 may receive broadcast signals from sources such as analog broadcasting stations or digital broadcasting stations. A broadcast signal received through the tuner 140 is decoded (e.g., audio decoding, video decoding, or additional information decoding) and separated into audio, video, and/or additional information. The separated audio, video, and/or additional information may be stored in the storage 190 under control of the controller 110.

The tuner 140 of the image display device 100a may be single or plural in number. The tuner 140 may be implemented as all-in-one with the image display device 100a or implemented as a separate device (e.g., a set-top box (not shown) having a tuner) electrically connected to the image display device 100a or as a tuner (not shown) connected to the I/O interface 170.

The communication interface 150 may connect the image display device 100a to an external device (e.g., an audio device) under control of the controller 110. The controller 110 may transmit/receive content to/from the external device connected through the communication interface 150, download an application from the external device, or perform web browsing through the communication interface 150. The communication interface 150 may include one of a wireless local area network (WLAN) interface 151, a Bluetooth interface 152, and a wired Ethernet interface 153 in correspondence with the performance and structure of the image display device 100a. In addition, the communication interface 150 may include a combination of the WLAN interface 151, the Bluetooth interface 152, and the wired Ethernet interface 153. The communication interface 150 may receive a control signal of the control device under control of the controller 110. The control signal may be implemented as a Bluetooth type, a radio frequency (RF) signal type, or a Wi-Fi type.

The communication interface 150 may further include other short-range communication interfaces (e.g., a near field communication (NFC) interface, not shown) and a Bluetooth low energy (BLE) communication interface (not shown) besides the Bluetooth interface 152.

The sensor 130 senses a voice of the user, an image of the user, or an interaction of the user and may include a microphone 131, a camera 132, and an optical receiver 133.

The microphone 131 receives a voice uttered by the user. The microphone 131 may convert the received voice into an electrical signal and output the converted electrical signal to the controller 110.

The camera 132 may receive an image (e.g., continuous frames) corresponding to a motion of the user, including a gesture, within a camera recognition range.

The optical receiver 133 receives an optical signal (including a control signal) from an external control device through an optical window (not shown) on a bezel of the display 120. The optical receiver 133 may receive an optical signal corresponding to a user input (e.g., a touch, a push, a touch gesture, a voice, or a motion) from the external control device.

The I/O interface 170 receives video (e.g., a moving picture), audio (e.g., a voice or music), and additional information (e.g., an EPG), and the like from the outside of the image display device 100a under control of the controller 110. The I/O interface 170 may include one of a high definition multimedia interface (HDMI) port 171, a component jack 172, a PC port 173, and a universal serial bus (USB) port 174. The I/O interface 170 may include a combination of the HDMI port 171, the component jack 172, the PC port 173, and the USB port 174.

The controller 110 controls a general operation of the image display device 100*a* and a signal flow between the internal components 110 to 190 of the image display device 100*a* and processes data. If an input of the user exists, or a previously set and stored condition is satisfied, the controller 110 may execute an operating system (OS) and various applications stored in the storage 190.

The controller 110 may include a random access memory (RAM) 181 used to store a signal or data input from the outside of the image display device 100*a* or used as a storage region corresponding to various operations performed by the image display device 100*a*, a read-only memory (ROM) 182 in which a control program for controlling the image display device 100*a* is stored, a processor 183, a graphic processing unit (GPU) 184 and first to nth interfaces 185-1 to 185-*n*.

The processor 183 may include a graphic processing unit (GPU, not shown) for processing graphics corresponding to video. The processor 183 may be implemented by a system on chip (SoC) in which a core (not shown) and a GPU (not shown) are integrated. The processor 183 may include a single core, dual cores, triple cores, quadruple cores, or a multiple number of cores thereof.

In addition, the processor 183 may include a plurality of processors. For example, the processor 183 may be implemented by a main processor (not shown) and a sub-processor (not shown) operating in a sleep mode.

The GPU 184 generates a screen image including various objects, such as an icon, an image, and a text, by using a computation unit (not shown) and a renderer (not shown). The computation unit computes attribute values such as a coordinate value, a shape, a size, and a color by which each object is to be displayed according to a layout of a screen image by using a user input sensed through the sensor 130. The renderer generates various layouts of screen images including objects based on the attribute values computed by the computation unit. A screen image generated by the renderer is displayed in a display area of the display 120. The GPU 184 according to an exemplary embodiment may map a planar-format 360° image to a sphere to generate a sphere-format 360° image, as described with reference to FIG. 1.

The first to nth interfaces 185-1 to 185-*n* are connected to the various components described above. One of the first to nth interfaces 185-1 to 185-*n* may be a network interface connected to an external device via a network.

The RAM 181, the ROM 182, the processor 183, the GPU 184, and the first to nth interfaces 185-1 to 185-*n* may be connected to each other via an internal bus 186.

In the present exemplary embodiment, the wording "controller of an image display device" may include the processor 183, the ROM 182, and the RAM 181.

The storage 190 may store various data, programs, or applications for operating and controlling the image display device 100*a* under control of the controller 110. The storage 290 may store a module including one or more instructions for generating a gamut mapping matrix corresponding to a pixel included in an input image based on a hue value and a saturation value of the pixel, changing the value of the pixel by using the gamut mapping matrix, and controlling the display 120 such that the display 120 displays the image in which the value of the pixel has been changed.

The storage 190 may store signals or data input/output in correspondence with operations of the video processor 180, the display 120, the audio processor 115, the audio output interface 125, the power supply 160, the tuner 140, the communication interface 150, the sensor 130, and the I/O interface 170. The storage 190 may store control programs for controlling the image display device 100*a* and the controller 110, applications initially provided from a manufacturer or downloaded from the outside, graphic user interfaces (GUIs) related to the applications, objects (e.g., image text, icons, and buttons) for providing the GUIs, user information, documents, databases (DBs), or related data.

According to an exemplary embodiment, the term "storage" includes the storage 190, the ROM 182 of the controller 110, the RAM 181 of the controller 110, or a memory card (e.g., a micro secure digital (SD) card or a USB memory, not shown) mounted in the image display device 100*a*. In addition, the storage 190 may include a nonvolatile memory, a volatile memory, a hard disk drive (HDD), or a solid state drive (SSD).

In addition, the image display device 100*a* having the display 120 may be electrically connected to a separate external device (e.g., a set-top box, not shown) having a tuner. For example, it will be easily understood by those of ordinary skill in the art that the image display device 100*a* may be implemented by an analog TV, a digital TV, a 3D TV, a smart TV, an LED TV, an OLED TV, a plasma TV, a monitor, or the like but is not limited thereto.

The block diagrams of the image display devices 100 and 100*a* shown in FIGS. 8 and 9 are only illustrative. Each component in the block diagrams may be integrated, added, or omitted according to the actually implemented specifications of the image display devices 100 and 100*a*. That is, according to circumstances, two or more components may be integrated into one component, or one component may be separated into two or more components. In addition, the functions performed in each block are to describe exemplary embodiments, and detailed operations or devices thereof do not limit the right scope of the inventive concept.

The disclosed exemplary embodiments may be implemented as program instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the inventive concept or may be known to and usable by one of ordinary skill in a field of computer software. Examples of the non-transitory computer-readable medium include magnetic media such as hard disks, floppy disks, or magnetic tapes, optical media such as compact disc-read only memories (CD-ROMs) or digital versatile discs (DVDs), magneto-optical media such as floptical discs, and hardware devices that are specially configured to store and carry out program commands, such as ROMs, RAMs, or flash memories. Examples of the program commands include a high-level language code that may be executed by a computer using an interpreter as well as a machine language code made by a complier.

The embodiments described above are only illustrative, and it will be understood by those of ordinary skill in the art that various changes in form and details may be made therein without changing the technical spirit and mandatory features of the inventive concept. Therefore, the embodiments should be understood in the illustrative sense only and not for the purpose of limitation in all aspects. For example, each component described as a single type may be carried out by being distributed, and likewise, components described as a distributed type may also be carried out by being coupled.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image display device comprising:
   a display;
   a controller configured to change a value of a pixel included in an input image based on a hue value and a saturation value of the pixel and control the display such that the display displays the image in which the value of the pixel has been changed, wherein the second controller is further configured to generate a gamut mapping matrix corresponding to the pixel based on the hue value and the saturation value and change the value of the pixel by using the generated gamut mapping matrix; and
   a memory configured to store weights corresponding to a plurality of hue values and a plurality of saturation values,
   wherein the controller is further configured to calculate a weight corresponding to the hue value and the saturation value of the pixel based on the stored weights corresponding to the plurality of hue values and the plurality of saturation values.

2. The image display device of claim 1, wherein the gamut mapping matrix corresponding to the pixel differs from a gamut mapping matrix corresponding to a pixel other than the pixel included in the input image.

3. The image display device of claim 1, wherein the gamut mapping matrix is determined by a linear combination of a first matrix expanding a color gamut of the input image to be displayed on the image display device to a color gamut of the image display device, a second matrix maintaining the color gamut of the input image to be displayed on the image display device, and a weight, and
   the weight indicates a ratio of the first matrix to the second matrix in the gamut mapping matrix.

4. The image display device of claim 3, wherein the first matrix and the second matrix are generated based on chromaticity coordinates of primary colors and a reference white color in the color gamut of the input image and the color gamut of the image display device.

5. The image display device of claim 3, wherein the first matrix is an identity matrix.

6. An image display device comprising:
   a display; and
   a controller configured to change a value of a pixel included in an input image based on a hue value and a saturation value of the pixel and control the display such that the display displays the image in which the value of the pixel has been changed,
   wherein the controller is further configured to generate a gamut mapping matrix corresponding to the pixel based on the hue value and the saturation value and change the value of the pixel by using the generated gamut mapping matrix,
   wherein the gamut mapping matrix is determined by a linear combination of a first matrix expanding a color gamut of the input image to be displayed on the image display device to a color gamut of the image display device, a second matrix maintaining the color gamut of the input image to be displayed on the image display device, and a weight,
   wherein the weight indicates a ratio of the first matrix to the second matrix in the gamut mapping matrix, and
   wherein the controller is further configured to determine a weight corresponding to the hue value and the saturation value and generate the gamut mapping matrix corresponding to the pixel based on the determined weight.

7. The image display device of claim 6, wherein the controller is further configured to determine the weight to be larger as the saturation value is higher.

8. The image display device of claim 6, wherein the controller is further configured to determine that the weight increases as a difference between first chromaticity coordinates in the color gamut of the input image and second chromaticity coordinates, which correspond to the first chromaticity coordinates, in the color gamut of the image display device increases.

9. An image display method being performed by an image display device comprising a display, a controller and a memory, the method comprising:
   changing, by the controller, a value of a pixel included in an input image based on a hue value and a saturation value of the pixel; and
   displaying, by the controller, the image in which the value of the pixel has been changed on the display,
   wherein the changing of the value of the pixel comprises:
   generating a gamut mapping matrix corresponding to the pixel based on the hue value and the saturation value; and
   changing the value of the pixel by using the generated gamut mapping matrix,
   wherein the method further comprises:
   storing, by the controller, weights corresponding to a plurality of hue values and a plurality of saturation values in the memory; and
   calculating, by the controller, a weight corresponding to the hue value and the saturation value of the pixel based on the stored weights corresponding to the plurality of hue values and the plurality of saturation values.

10. The image display method of claim 9, wherein the gamut mapping matrix corresponding to the pixel differs from a gamut mapping matrix corresponding to a pixel other than the pixel included in the input image.

11. The image display method of claim 9, wherein the gamut mapping matrix is determined by a linear combination of a first matrix expanding a color gamut of the input image to be displayed on an image display device to a color gamut of the image display device, a second matrix maintaining the color gamut of the input image to be displayed on the image display device, and a weight, and
   the weight indicates a ratio of the first matrix to the second matrix in the gamut mapping matrix.

12. A non-transitory computer-readable recording medium having recorded thereon a computer-readable program for implementing the image display method of claim 9.

13. An image display method being performed by an image display device comprising a display, a controller and a memory, the method comprising:
  changing, by the controller, a value of a pixel included in an input image based on a hue value and a saturation value of the pixel; and
  displaying, by the controller, on the display, the image in which the value of the pixel has been changed,
  wherein the changing of the value of the pixel comprises:
  generating a gamut mapping matrix corresponding to the pixel based on the hue value and the saturation value; and
  changing the value of the pixel by using the generated gamut mapping matrix,
  wherein the gamut mapping matrix is determined by a linear combination of a first matrix expanding a color gamut of the input image to be displayed on an image display device to a color gamut of the image display device, a second matrix maintaining the color gamut of the input image to be displayed on the image display device, and a weight,
  wherein the weight indicates a ratio of the first matrix to the second matrix in the gamut mapping matrix, and
  wherein the generating of the gamut mapping matrix comprises:
  determining a weight corresponding to the hue value and the saturation value; and
  generating the gamut mapping matrix corresponding to the pixel based on the determined weight.

14. The image display method of claim 13, wherein the determining of the weight comprises determining the weight to be larger as the saturation value is higher.

15. The image display method of claim 13, wherein the determining of the weight comprises determining that the weight increases as a difference between first chromaticity coordinates in the color gamut of the input image and second chromaticity coordinates, which correspond to the first chromaticity coordinates, in the color gamut of the image display device increases.

16. The image display method of claim 11, wherein the first matrix and the second matrix are generated based on chromaticity coordinates of primary colors and a reference white color in the color gamut of the input image and the color gamut of the image display device.

* * * * *